March 28, 1950 — C. F. ERIKSON — 2,502,316

PUMPING MECHANISM

Filed April 17, 1948 — 3 Sheets-Sheet 1

INVENTOR.
CARL F. ERIKSON
BY
Walter E. Wallheim
ATTORNEY

March 28, 1950     C. F. ERIKSON     2,502,316
PUMPING MECHANISM
Filed April 17, 1948     3 Sheets-Sheet 2
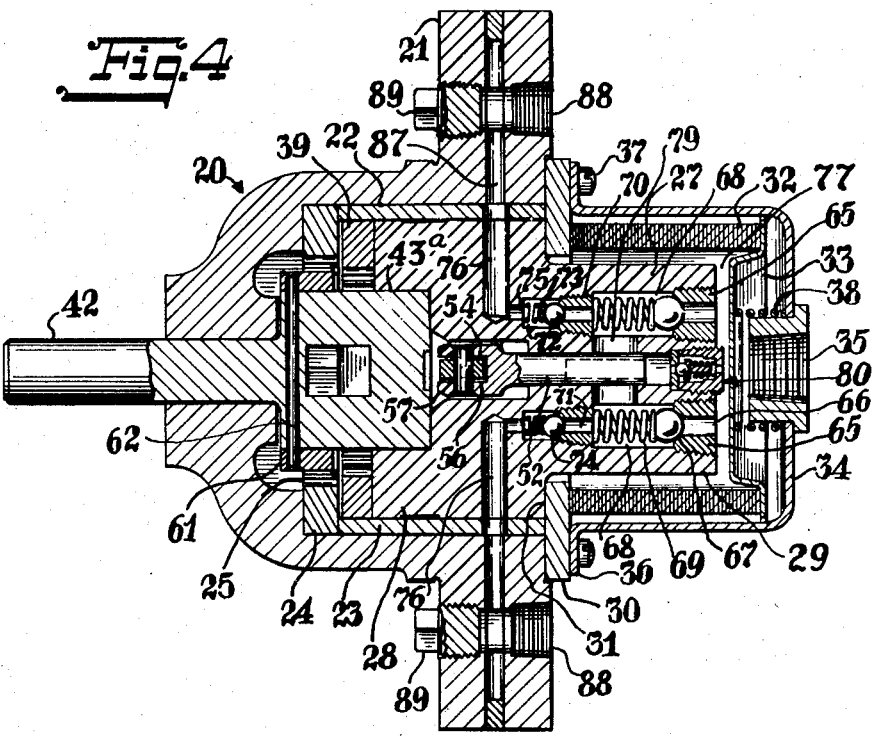
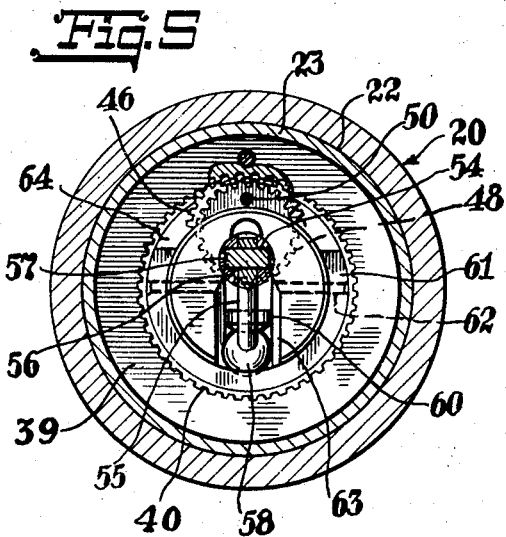
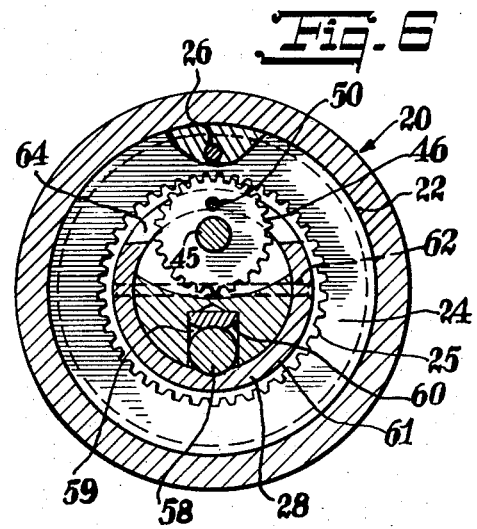
INVENTOR.
CARL F. ERIKSON
BY
Walter E. Wallheim
ATTORNEY March 28, 1950  C. F. ERIKSON  2,502,316
PUMPING MECHANISM
Filed April 17, 1948  3 Sheets-Sheet 3
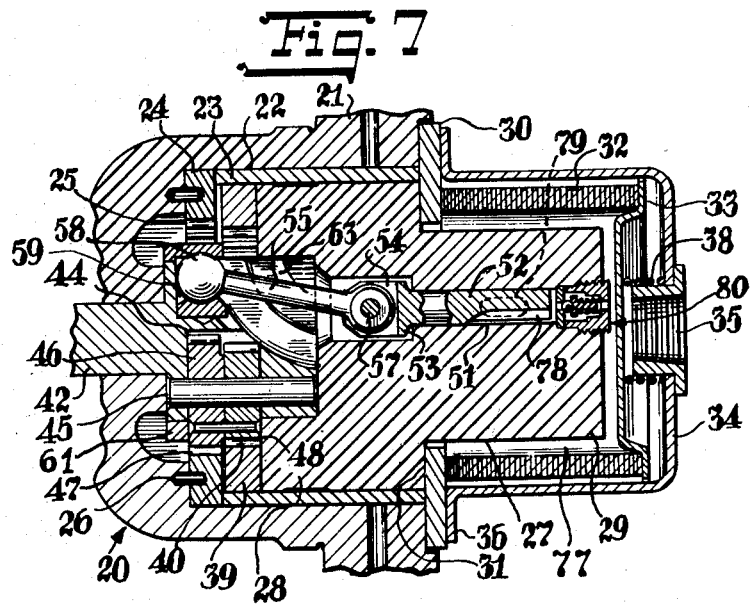
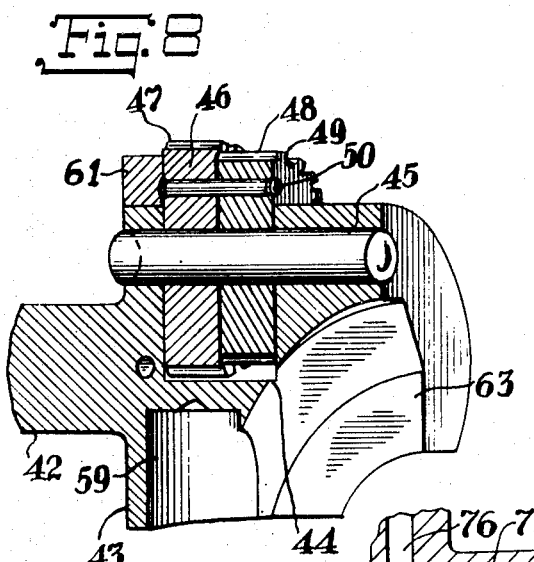
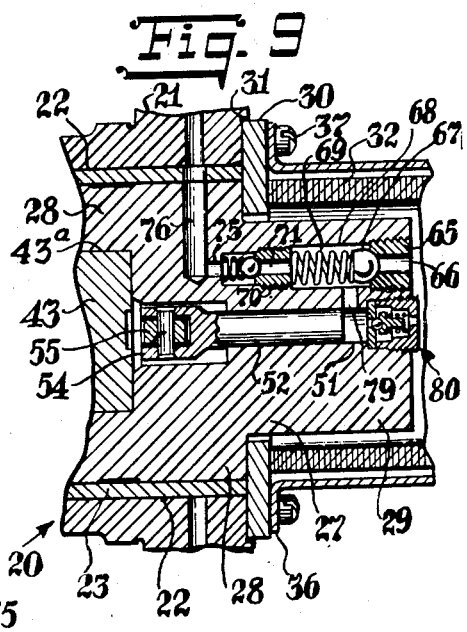
INVENTOR.
CARL F. ERIKSON
BY Walter E. Wallheim
ATTORNEY Patented Mar. 28, 1950

2,502,316

UNITED STATES PATENT OFFICE 2,502,316

PUMPING MECHANISM

Carl F. Erikson, White Plains, N. Y., assignor to Nathan Manufacturing Company, New York, N. Y., a corporation of New York Application April 17, 1948, Serial No. 21,670

9 Claims. (Cl. 103—2)

This invention refers to pumping mechanism especially suited for forcing oil from a remote reservoir to points to be lubricated.

A principal object of the invention is to provide a simple mechanism for actuating a single plunger to discharge a lubricant consecutively from a plurality of outlets in a housing within which the mechanism is located.

Another object is to make the mechanism reversible so that its drive can be operated in either direction.

A further object is to provide a single relief valve adapted to by-pass oil from the plunger cylinder during the discharge stroke of the plunger back to a common inlet chamber should any of the discharge lines from the housing be obstructed or an excessive pressure develop at the point of lubrication, without affecting the discharge of oil from the cylinder to the other lines.

A still further object is to provide a filter element at the inlet of the pump for the purpose of filtering the oil if the pump should be used for circulating oil in a lubricating system such as used, for instance, in heavy machine tools.

Other objects will become apparent in the following specification and the accompanying drawings in which a preferred embodiment of the invention is shown.

In the drawings:

Fig. 4 is a horizontal sectional view along the plane of line 4—4 in Fig. 1 and passing through the horizontal axis of the plunger;

Fig. 5 is a cross sectional view along the plane of line 5—5 in Fig. 1;

Fig. 6 is a cross sectional view along the plane of line 6—6 in Fig. 1;

Fig. 7 is a fragmentary sectional view similar to Fig. 1 but with the plunger at the end of its forcing stroke;

Fig. 8 is a fragmentary sectional view, partly in perspective, showing an enlarged fragmentary part of a planetary gear drive for the plunger;

Fig. 9 is a fragmentary sectional view similar to Fig. 4 showing a modified construction; and Fig. 10 is a fragmentary sectional view of the cylinder block only in another modified form.

Like characters of reference denote similar parts throughout the several views and the following specification.

Figure 1:
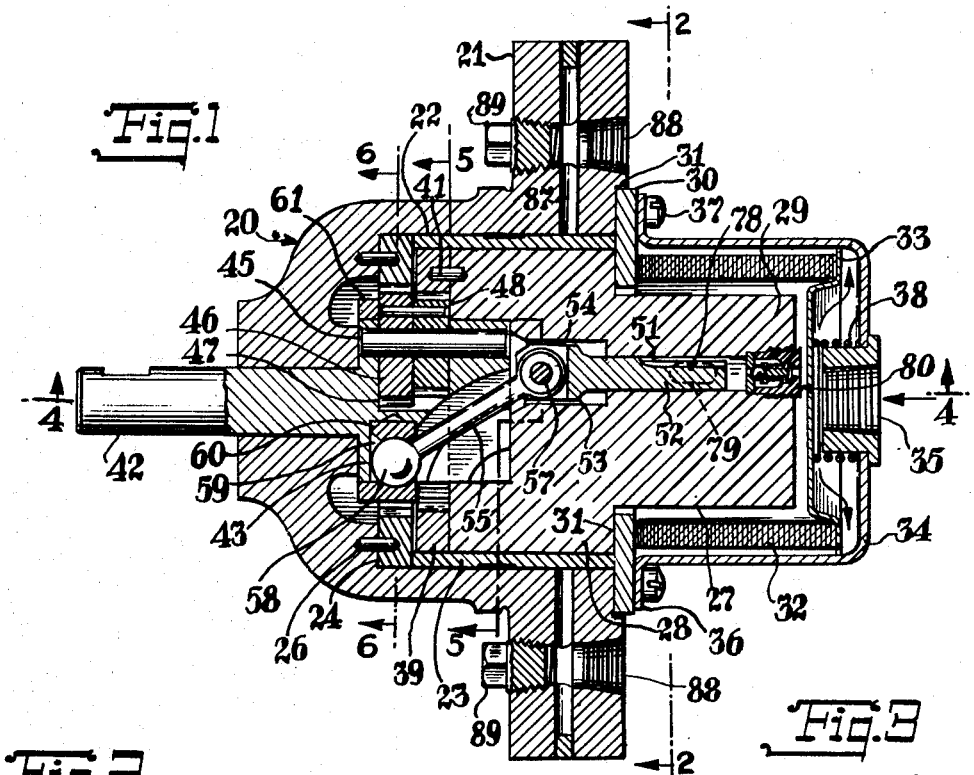
Fig. 1 is a longitudinal sectional view of the pump assembly with its plunger at the end of its suction stroke.

20 is a substantially cylindrical pump housing having a flange 21 at one end and an inner recess 22. 23 is a bushing rotatably fitted into the recess 22. 24 is a fixed sungear of a planetary gear train having internal teeth 25, the gear being fitted into the bottom of the recess 22 and secured to the housing by pins 26.

27 is a rotatable block having a large portion 28 onto which bushing 23 is tightly fitted so as to rotate with the block. The block has a small portion 29 extending outwardly of the housing 20. 30 is a flange engaging a shoulder 31 to hold the block 27 within the housing 20. A cylindrical filter 32 of suitable commercial design surrounds portion 29 and is held evenly spaced around it by a follower plate 33. 34 is a cup-shaped cover having an inlet 35 and a flange 36 securing the cover and flange 30 to the pump housing 20 by means of screws 37. A spring 38 between plate 33 and cover 34 serves to hold plate 33 against the filter 32 and the filter against the flange 30. 39 is a moving sungear of the planetary gear train having internal teeth 40, the gear being secured to the inner face of block 27 by pins 41. The pitch diameter of the teeth 40 is somewhat smaller than the pitch diameter of teeth 25 of sungear 24 for reasons explained later.

42 is a drive shaft journaled in pump housing 20 and having an enlarged head 43 within the recess 22 and supported within a recess 43a in the inner face of the block 27. 44 is a transverse slot in the head 43. 45 is a small shaft supported within the head 43 parallel to the axis of the drive shaft 42 and passing through slot 44. Mounted upon shaft 45 and disposed within the slot 44, as clearly shown in Fig. 8, is a pinion 46 having teeth 47 engaging internal teeth 25 of sungear 24, and another pinion 48, slightly smaller in diameter than pinion 46, having teeth 49 engaging internal teeth 40 of sungear 39. Pinions 46 and 48 are fastened to each other by a pin 50. Fixed sungear 24, moving sungear 39, pinions 46 and 48 constitute the planetary gear train.

Rotatable block 27 has a cylinder 51 eccentric to its axis. A plunger 52, reciprocably disposed within the cylinder 51 has a head 53, slotted at 54. 55 is a link having a flattened portion 56 at one end, pivotally supported within the slot 54 by a pin 57 forming a clevis joint between the link and the plunger. The other end of link 55 terminates in a ball 58. 59 is a socket in head 43 of drive shaft 42 and at right angles to its axis. A bearing 60 is pressed into the bottom of socket 59. Ball end 58 of link 55 is confined within the socket, a ring 61 around the head 43, fastened thereto by a pin 62, holding it in place. 63 are slotted recesses in the face of head 43 to provide clearance for the movement of link 55. Ring 61 is slotted at 64 to clear pinion 46.

Figure 2:
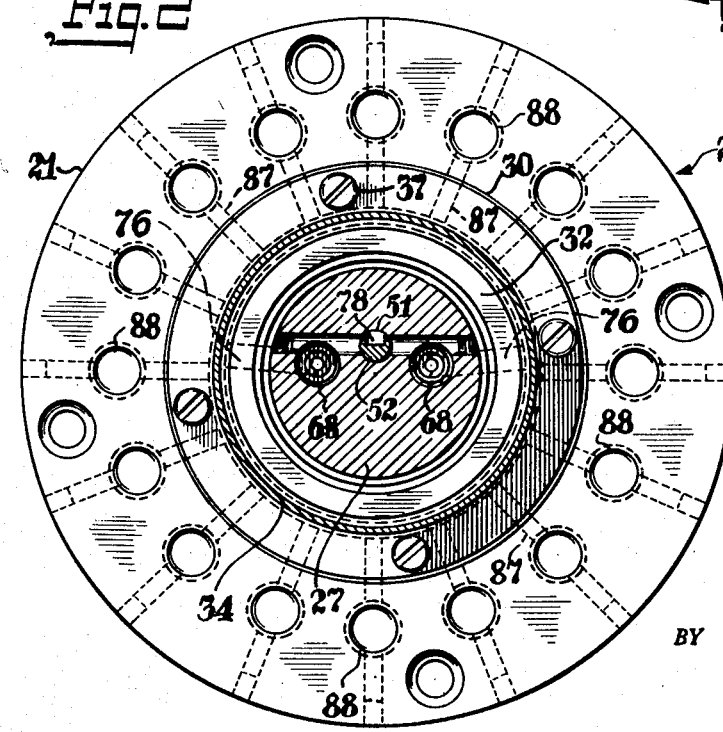
Fig. 2 is a cross sectional view along the plane of line 2—2 in Fig. 1.

In the block 27, at both sides of cylinder 51, as shown in Figs. 2 and 4, is an inlet and an outlet check valve comprising a plug 65, screwed into the block, having an inlet port 66, a ball check 67 in a chamber 68, a spring 69 forcing the check 67 against a seat in the chamber around the inlet port 66, another plug 70 screwed into the opposite end of chamber 68 having an outlet port 71 connecting the chamber with an outlet chamber 72, and a spring 73 holding a ball check 74 in the outlet chamber against a seat in the chamber around the outlet port 71. The component parts of each set of these valves are preferably coaxially disposed, as shown. 75 is a small outlet duct connected to a radially disposed passage 76 at substantially right angles thereto. Thus, at each side of the cylinder, there is one combination inlet and outlet check valve, each connecting the space between inlet 35 in cover 34 and the outside of the small portion 29 of the block 27, designated as an inlet chamber 77, with the outlet passage 76 in the block. The plunger 52 is provided with a groove 78, adapted to communicate during its rotation and reciprocation alternately with an oblong suction port 79 at each side of the plunger between cylinder 51 and each of the chambers 68.

Figure 3:
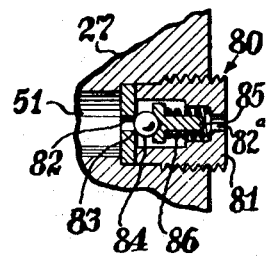
Fig. 3 is an enlarged fragmentary sectional view of a relief valve.

80 is a relief valve screwed into the cylinder, shown in an enlarged scale in Fig. 3, and consisting of a valve casing 81 having an inlet 82, a seat 83, a ball check 84 adapted to fit the seat 83, a ball follower pin 85, and a spring 86 adapted to force the ball check 84 against the seat 83. An outlet 82a in the casing 81 communicates with the inlet chamber 77.

Radially disposed in the flange 21 of the housing 20, and in axial alignment with outlet passages 76, are discharge ducts 87, one for each feed from the pump. By way of example, a sixteen feed pump has been shown and, therefore, sixteen discharge ducts 87. The flange 21 is tapped at both faces for a pair of outlets 88 communicating with discharge ducts 87, one of the outlets of each pair being closed by a plug 89, so that an outlet pipe can be connected to either side of the flange, for each feed, as desired.

The operation of the pump is as follows:

The reciprocation and rotation of the plunger 51 are obtained by virtue of the link 55 which is socketed eccentrically in the head 43 of the drive shaft 42 at one end and connected by a clevis joint at its other end to the plunger. The socket for one end of the link is laterally displaced with reference to the plunger axis. During the rotation of the drive shaft, the socket in the head of the drive shaft for one end of the link 55 describes a circular path non-concentric with a circular path described by the plunger because of the eccentric disposition of the plunger axis in the block 27. This changes the angle of the link during its travel with respect to the common axes of drive shaft and block and reciprocates the plunger proportionately. Rotation of the plunger is caused by the difference in speeds of the drive shaft and the block.

The components of the planetary gear train are so proportioned for a sixteen feed pump, for instance, that while the drive shaft 42 makes seventeen revolutions, one more than the number of feeds, the cylinder block 27 makes one revolution. The number of outlets or feeds from the pump being sixteen, and the difference in the number of revolutions between drive shaft and cylinder block being sixteen, the plunger 52 makes one travel cycle, or a suction and discharge stroke, for each outlet during one revolution of the block 27, or a total of sixteen travel cycles during one revolution of the block. This means that while, for instance, the outlet passage 76 in block 27 which communicates with the outlet duct 75 of the set of valves disposed at one side of the plunger, is about to come in register with one of the discharge ducts 87 in the pump body, the plunger 52 makes a suction stroke which causes oil to be drawn into the cylinder by way of port 79 when that port is in register with groove 78 of the plunger through the inlet 66 of the chamber 68 of the set of combination inlet and outlet check valves at the other side of the plunger. During the forcing stroke of the plunger in its travel cycle, the plunger has rotated so as to bring groove 78 out of registry with the port 79 of the valves at the other side of the plunger and instead communicates with port 79 of the other valves. Continuing its motion, the plunger forces the oil from the cylinder 51, through port 79, past ball check 74, chamber 72, duct 75, passage 76, into discharge ducts 87.

While this travel cycle takes place, the block gradually moves on to bring outlet passage 76 in register with the next discharge duct 87 and the cycle is repeated. To insure registering of the outlet passage 76 with the discharge duct 87 while the block 27 rotates and while the travel cycle of the plunger takes place, passage 76 in the block and bushing 23 is, preferably, made somewhat larger in diameter than duct 87.

During the forcing stroke of the plunger in the travel cycle, just explained, the inlet check valve at one side of the plunger, which served as an oil inlet to the cylinder, remains inactive because the plunger shuts off suction port 79, as stated before, or in other words acts as an inlet only. In reversing the rotation of the drive shaft of the pump, the valves at one side of the plunger serve as an inlet only, while oil is discharged through the valves at the other side of the plunger. This and the symmetrical disposition of the valves insure complete reversibility of the pump drive and make is possible to operate the pump at high speed.

In case one of the outlet pipes should become obstructed, the relief valve 80 which is set to open at a predetermined pressure higher than the pressure against which oil is to be delivered, will be opened by this higher pressure during the forcing stroke of the plunger and permit oil from the cylinder to be by-passed into the inlet chamber 77. This safeguards the pump structure against breakage while not affecting the feed of oil through its other outlet pipes.

While I have shown and described a sixteen feed pump, a similar proportion and ratio of the planetary gear train can be used in pumps having a different number of outlets as long as the ratio between the number of revolutions of drive shaft to cylinder block is such that the drive shaft makes revolutions of one plus the number of outlets while the cylinder block makes one revolution during which the plunger makes as many travel cycles as there are outlets in the pump.

Fig. 9 shows a slight modification of the pump mechanism for relatively slow speeds. Instead of having two sets of valves in the block 27, one at each side of the piston, only one set of valves is shown. The plunger 52 has no groove but its end shuts off or fully exposes a single port 79. The one set of valves serves as an inlet check and as an outlet check in the usual manner. Because there is usually a slight lag between opening and closing the valves, both of which are used in this modification, the pump cannot be operated at as high a speed as the pump described before. The operation of the pump mechanism is otherwise in all respects identical with the one previously described. The same reference numbers have been used.

Where reversibility of the drive is not a factor, the ball checks, as shown in Figs. 4 and 9 could be omitted entirely, and only one passage 76 provided for in the block 27 in communication with port 79 at the same side of the plunger 52, the port 79 at the other side of the plunger being in direct communication with the inlet chamber 77. The plunger with its groove, will then act as a valve during its rotation and draws oil into the cylinder from the inlet chamber during its suction stroke and discharges the oil through passage 76 during its forcing stroke. This modification is shown in Fig. 10.

Many other modifications in the form, proportion, combination of parts and minor details of construction may be resorted to without departing from the principles or sacrificing any of the advantages of the invention as defined in the appended claims.

What I claim as new is:

1. In an housing with an inlet and a plurality of outlets, pumping mechanism comprising a rotatable block having a cylinder eccentrically disposed with respect to the axis of the block, a plunger within the cylinder, a drive shaft supported in the housing, a link having one end fastened to the plunger and its other end to the drive shaft laterally displaced with reference to the cylinder axis, and means between the drive shaft and the block for reciprocating and rotating the plunger once for each outlet while the block makes one revolution, whereby oil is drawn from the inlet and discharged from each outlet successively through conduits in alternate register, respectively, with the cylinder and the inlet and with the cylinder and one of the outlets.

2. In a structure as defined in claim 1, the means for reciprocating and rotating the plunger including a planetary gear train operatively connecting the drive shaft and the block.

3. In a structure as defined in claim 1, the means for reciprocating and rotating the plunger including a planetary gear train operatively connecting the drive shaft and the block adapted to rotate the drive shaft a number of revolutions equal to the number of outlets plus one.

4. In a structure as defined in claim 1, a relief valve in the cylinder, normally closed, adapted to open and by-pass oil into the housing inlet when the pressure in that outlet which is in register with the cylinder during the reciprocation of the plunger is greater than a predetermined amount.

5. In a structure as defined in claim 1, the housing having an extension containing its inlet, a filter element within the extension, the conduits in the cylinder adapted to register with the inlet terminating within the filter element.

6. In a structure as defined in claim 1, the housing having an extension containing its inlet, a filter element within the extension, the conduits in the cylinder adapted to register with the inlet terminating within the filter element, a relief valve in the cylinder, normally closed, adapted to open and by-pass oil into the extension when the pressure in that outlet which is in register with the cylinder during the reciprocation of the plunger is greater than a predetermined amount.

7. In a housing with an inlet and a plurality of outlets, pumping mechanism comprising a rotatable block having a cylinder eccentrically disposed with respect to the axis of the block, the cylinder having an inlet passage adapted to communicate with the housing inlet and a discharge passage adapted to communicate with one of the outlets, a plunger within the cylinder, a drive shaft supported in the housing, a link having one end fastened to the plunger and its other end to the drive shaft laterally displaced with reference to the cylinder axis, and means between the drive shaft and the block for reciprocating and rotating the plunger once for each outlet while the block makes one revolution, whereby the inlet passage and the discharge passage are placed in communication with the cylinder alternately as the piston rotates and oil is drawn from the inlet into the cylinder and discharged from each outlet successively during the reciprocations of the plunger.

8. In an housing with an inlet and a plurality of outlets, pumping mechanism comprising a rotatable block having a cylinder eccentrically disposed with respect to the axis of the block, a plunger within the cylinder, a drive shaft supported in the housing, a link having one end fastened to the plunger and its other end to the drive shaft laterally displaced with reference to the cylinder axis, the block having an inlet check valve in communication with the housing inlet, an outlet check valve adapted to communicate with one of the outlets, and a port between the check valves and the cylinder, and means between the drive shaft and the block for reciprocating and rotating the plunger once for each outlet while the block makes one revolution, whereby oil is drawn into the cylinder through the inlet check valve and discharged through the outlet check valve successively when in communication with one of the outlets.

9. In an housing with an inlet and a plurality of outlets, pumping mechanism comprising a rotatable block having a cylinder eccentrically disposed with respect to the axis of the block, a plunger within the cylinder, a drive shaft supported in the housing, a link having one end fastened to the plunger and its other end to the drive shaft laterally displaced with reference to the cylinder axis, the block having at either side of the plunger an inlet check valve in communication with the housing inlet and an outlet check valve adapted to communicate with one of the outlets, the plunger having ports alternately connecting through the cylinder the inlet check valve at one side with the outlet check valve at the other side during its rotation, and means between the drive shaft and the block for reciprocating and rotating the plunger once for each outlet while the block makes one revolution, whereby oil is drawn into the cylinder through the inlet check valve at one side and discharged through the outlet check valve at the other side successively when in communication with one of the outlets.

CARL F. ERIKSON.

REFERENCES CITED

The following references are of record in the file of this patent:

UNITED STATES PATENTS

| Number | Name | Date |
|---|---|---|
| 857,221 | Anderson et al. | June 18, 1907 |
| 1,244,160 | Anderson | Oct. 23, 1917 |
| 1,326,889 | Anderson | Dec. 30, 1919 |
| 2,104,590 | Hill | Jan. 4, 1938 |